Figure 2:
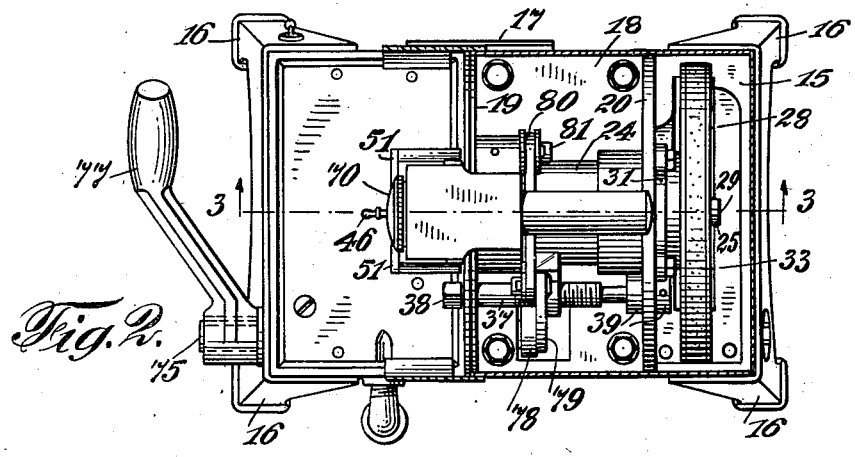

April 7, 1942.  T. L. CAMP  2,279,159
OIL TESTING DEVICE
Filed June 13, 1940  4 Sheets-Sheet 1

INVENTOR
Thomas L. Camp
BY
ATTORNEY

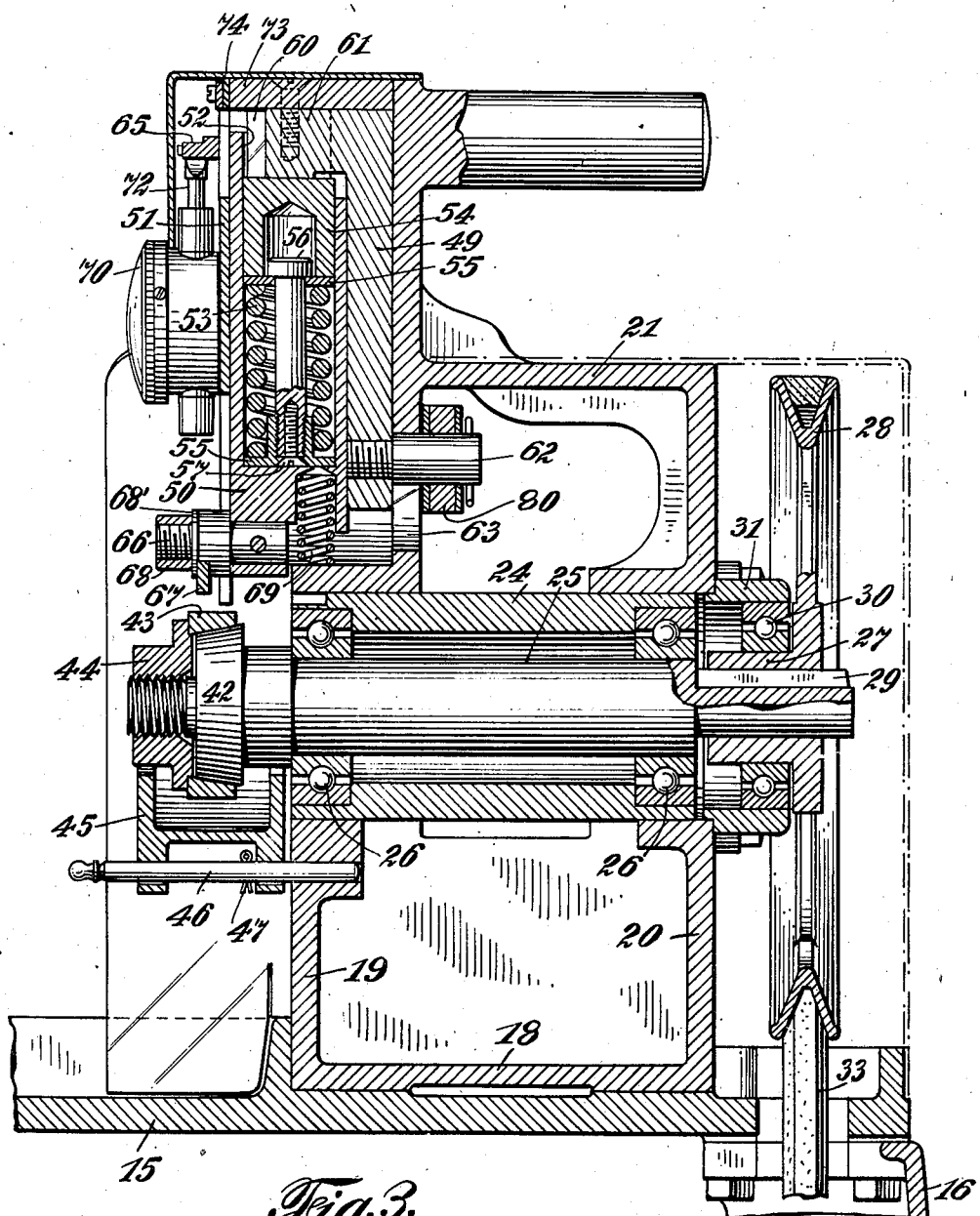

April 7, 1942.  T. L. CAMP  2,279,159
OIL TESTING DEVICE
Filed June 13, 1940  4 Sheets-Sheet 3

INVENTOR
Thomas L. Camp
BY
ATTORNEY

April 7, 1942.   T. L. CAMP   2,279,159
OIL TESTING DEVICE
Filed June 13, 1940   4 Sheets-Sheet 4
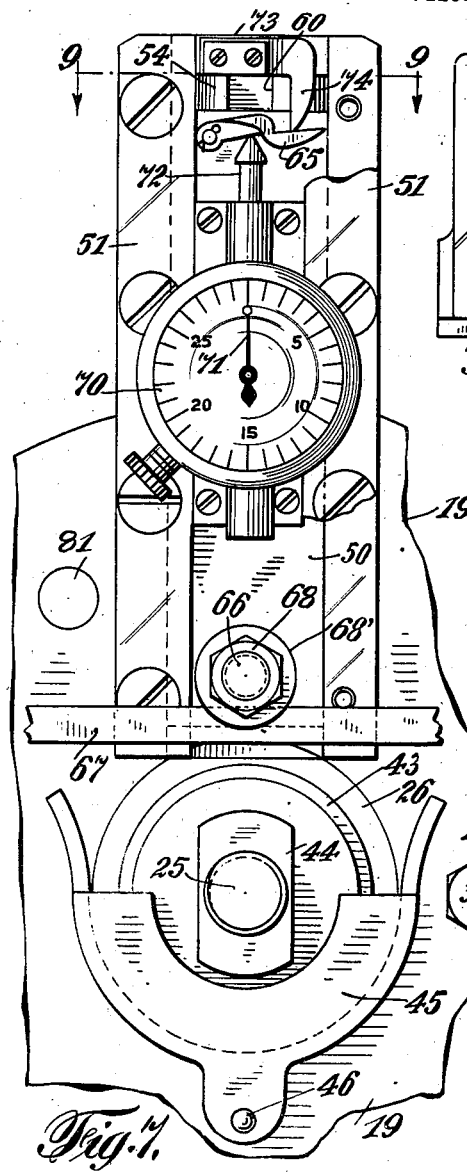
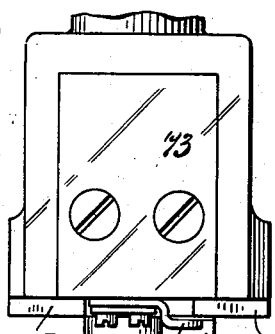
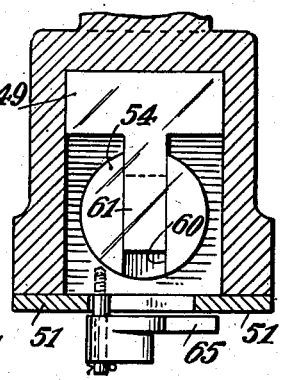
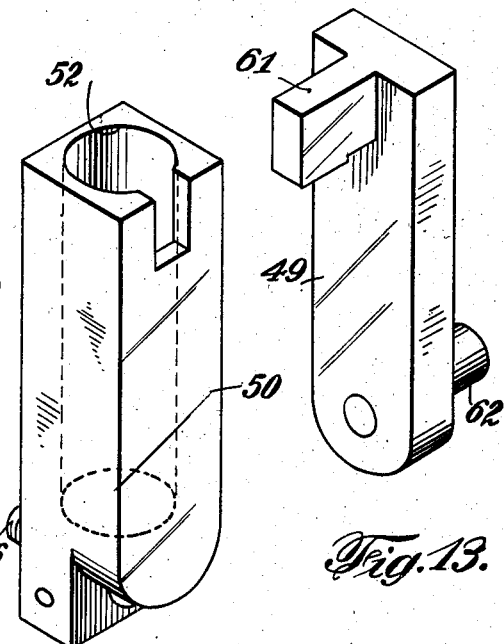
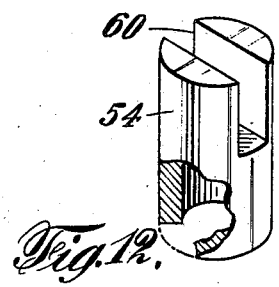
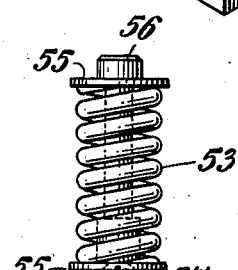
INVENTOR
Thomas L. Camp
BY
ATTORNEY

Patented Apr. 7, 1942

2,279,159

UNITED STATES PATENT OFFICE 2,279,159

OIL TESTING DEVICE

Thomas L. Camp, Los Angeles, Calif., assignor to Permatex Company, Inc., Brooklyn, N. Y., a corporation of New York Application June 13, 1940, Serial No. 340,304

7 Claims. (Cl. 265—10)

The invention relates to apparatus for determining the absolute and relative film strengths of different oils, in other words their boundary lubrication characteristics.

Lubricating oils and greases act by keeping the opposing metal surfaces apart, so that, instead of the high and destructive friction of metal-to-metal contact, there is the much smaller and usually harmless internal friction resulting from the movement of the oil in the film between the two surfaces as they slide over each other. A film of oil or grease is maintained between the metal surfaces by virtue of its ability to "wet" metal surfaces. This ability to "wet" results from the fact that the energy of an oil-metal interface is less than that of an air-metal interface, so that the total energy of two metal surfaces separated by a film of oil is less than that of the same surfaces separated by air. Surface energy relationships are the basis of all capillary attraction phenomena.

The magnitude of this attraction of a metal for any particular oil or grease determines the pressure required to squeeze out the last part of the film between two surfaces of such metal. Viscosity plays an important part in the rate at which the film thickness is reduced to its minimum, but not in determining the pressure at which the rupture of the film takes place and metal-to-metal contact begins.

In the use of machinery, metal-to-metal contact must be avoided at all costs, otherwise pistons, bearings, or other parts will seize. It is very important, therefore, to determine the boundary characteristics of the lubrication oil it is desired to use.

Various forms of apparatus have been developed for measuring such characteristics by pressing a non-rotatable block against a lubricated metal ring until they begin to seize and observing the pressure required to bring that about. Such apparatus has, in general, been clumsy and heavy, in addition to being inaccurate.

One of the principal objects, therefore, of the present invention is to provide a simple, compact, accurate and readily operated machine for determining the boundary characteristics of lubricating oils.

One important feature of my invention relates to the production of a sharp, well-defined indication of the pressure at which the lubrication boundary is reached. I have found that this desirable result can be obtained by making the non-rotatable block of an alloy possessing to a greater or lesser degree the property of red-hardness. Suitable alloys are the high-speed steels of the tungsten-chromium type, the cobalt-tungsten-chromium alloys of the Stellite type, and the sintered tungsten carbide alloys of the Carbaloy type. The explanation for the superior results obtained with alloys having a considerable degree of red-hardness is believed to be as follows:

When a non-rotating block of metal is pressed against a rotating metal ring covered with a film of the oil to be tested, heat is generated. As the pressure increases the internal friction of the oil film increases and with it, of course, the temperature of the oil film. When the film breaks, i. e. when the lubrication boundary is reached, there is metal-to-metal contact and a sharp increase in friction. At that instant, therefore, there is a sudden, very rapid rise in temperature. This temperature rise is localized at the contacting surfaces as the result of the fact that there is a marked time factor in heat-dissipation. This rapid temperature rise appears to be sufficient to cause surface softening of ordinary hardened steels and even surface fusion in the case of low-melting alloys. As a result, there seems to be a surface flow of metal which reduces the metal-to-metal friction greatly below what it would be without such superficial softening or fusion. This reduction of the metal-to-metal friction cuts down the differential between that friction and the internal friction of the oil just prior to the time the film breaks, and makes the exact timing of the film breaking point harder to observe.

It is not ordinarily essential to make the rotating ring of an alloy possessing red-hardness, especially where only a small part of the periphery of such ring is frictionally engaged at any one time. In such cases, there is a large 'off-on' ratio for the ring, permitting cooling of the ring during the 'off' periods sufficient to prevent surface softening to any great extent. On the other hand, the non-rotating block is 'on' all the time the test is being conducted and hence should be of heat-resistant material.

Another outstanding feature of the invention is the provision of means for controlling the pressure so that it can not only be varied readily but also relieved immediately the instant the oil film breaks. The pressure per unit area at the time of break is the total pressure divided by the area of contact. Unless the pressure is relieved immediately, the non-rotatable block will be worn away an undeterminable extent between the time the film breaks and the time the pressure is relieved.

To be able to vary the pressure readily, a spring is used since, without a spring, the pressure with practically no movement of the force-applying means may go from zero to 10,000 lbs. Further, unless there is a spring to compress it is difficult to measure the pressure. With a spring the pressure can be measured by providing means for measuring the extent to which the spring is compressed.

It has been found that to secure accurate readings the spring should be pre-compressed to some extent, so that there is no lag or back-lash to take up in the operation of the machine.

Where a screw is used to apply the force required to compress the spring several turns of the screw are necessary before the compression of the spring can be relieved. During the time required to turn the screw, an undeterminable amount of wear takes place. According to the present invention, therefore, a manually operated system of links, cranks and levers is used to enable the pressure on the spring to be relieved instantly. As the pressures required are relatively high, a toggle system of cranks and levers is employed to progressively increase the leverage of the operating handle as the spring is compressed further and further.

For a portable machine it is desirable that the necessary manual pressure be exerted by pressing downwards. That means that the operating handle should not have to move further than from a nearly vertical upward position to a nearly vertical downward position, i. e. less than 180°, and preferably the machine should be designed so that the maximum effort should come when the handle is not far from horizontal.

With an operating handle having a small arc of movement, the test-block can be very rapidly lifted away from the test-ring.

In general, more accurate results are obtained by using a flat bar for the non-rotatable test-block, instead of a bar having an end shaped to fit the periphery of the test-ring. At the breaking point the film of oil is so thin that, unless the two surfaces have been ground together, like a poppet valve on its seat, the chances are that the film is broken at one or two spots only. How large a proportion of the surface supposedly in contact is in actual contact is problematical and this uncertainty makes it impossible to interpret the results observed with any degree of accuracy. Where, however, a curved indentation is worn on a flat test-bar by the rubbing of the test-ring against it, it may be assumed that the whole area of that indentation is in contact with the test-ring the moment after the film breaks. While strictly speaking that may not be true, demonstrations have shown that it is sufficiently near the truth to give satisfactory comparative data for a series of oils.

Where a test-bar and test-ring are used there is at the outset line contact only, which soon widens into a band of appreciable width before real metal-to-metal contact occurs. However, film breakage or boundary conditions are reached with a relatively small area of contact. This is of importance as it enables high pressures per square inch to be readily obtained by a simple system of cranks and levers having a much smaller leverage than screw operated devices.

Other features of the invention will be described in connection with the specific embodiment shown in the drawings.

Figure 1:
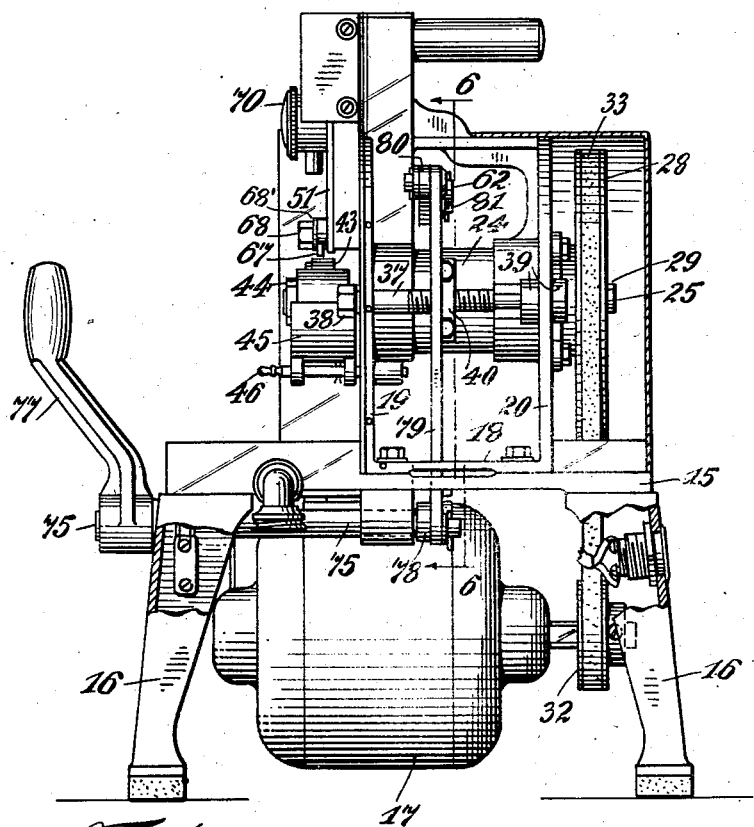
Figures 4, 5:
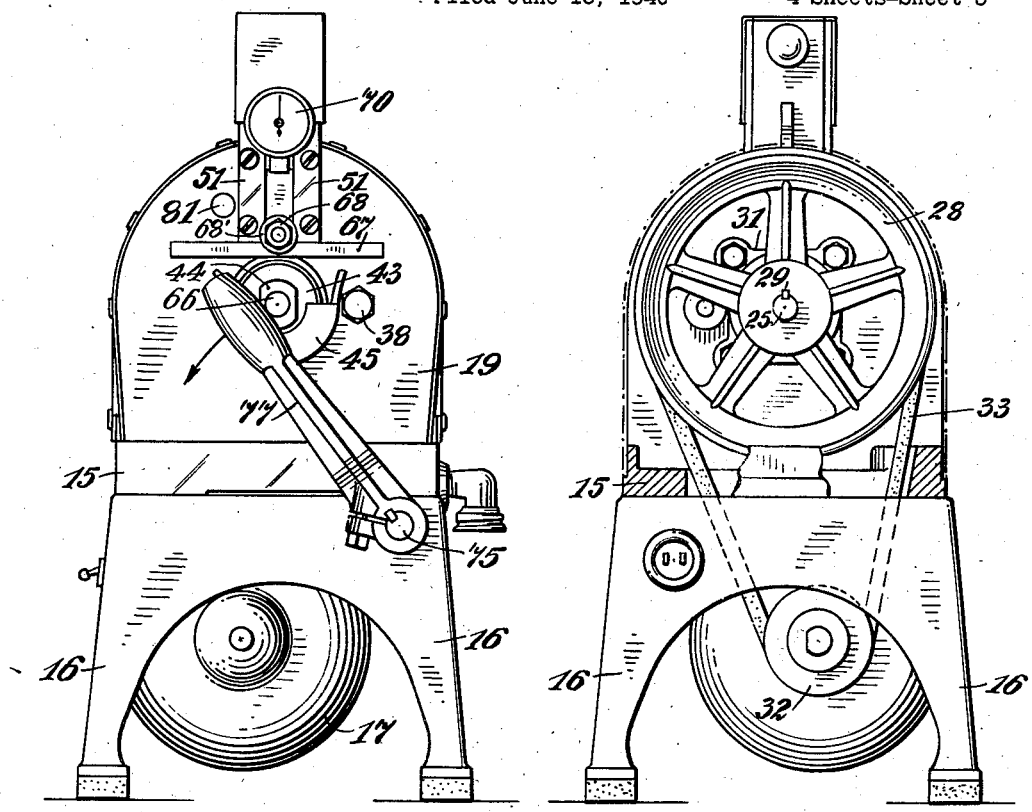
Figure 6:
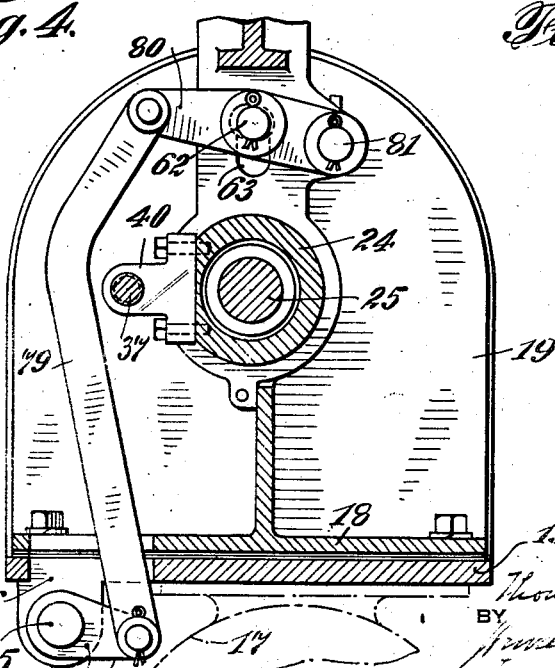

One suitable form of construction is illustrated, by way of example, in the accompanying drawings, wherein:

Figure 1 is a side elevation of the machine;
Figure 2 is a top view of the same;
Figure 3 is a section on the line 3—3, Figure 2;
Figure 4 is a front elevation of the same;
Figure 5 is a rear elevation of the machine;
Figure 6 is a section on the line 6—6 of Figure 1;
Figure 7 is a detail view showing the test-ring, test-bar and associated parts;
Figure 8 is a top view of the parts shown in Figure 7;
Figure 9 is a section on the line 9—9 of Figure 7;
Figure 10 is a perspective view of the slidable member which carries the test-bar;
Figure 11 is a side elevation of the heavy coil spring which fits inside the member shown in Figure 10;
Figure 12 is a perspective view of the pusher block which rests on the top of the spring shown in Figure 11; and
Figure 13 is a perspective view of the member which forces the parts shown in Figures 10, 11, and 12 downwardly to bring the test-bar into contact with the test-ring.

The machine comprises a base 15 with a pair of legs 16 at each end. The driving motor 17 is mounted on the underside of the base 15.

Bolted to the top of the base is a frame comprising a bottom portion 18, two uprights 19 and 20, and a cross connecting piece 21. In the two uprights a bearing sleeve 24 is slidably mounted, within which sleeve is rotatably mounted a horizontal shaft 25 by means of ball bearings 26. The purpose of making the sleeve slidable is to enable a relatively broad test-ring to be used more efficiently. With a narrow test-bar only a narrow peripheral strip or band on the test-ring is scored when metal-to-metal contact occurs. If, after a test has been made, the test-ring can be moved axially so as to bring a fresh surface underneath the test-bar, it is not necessary to replace the test-ring more often than every two, three, or more tests.

Means are also provided, as will be described later, for moving the test-bar longitudinally between each test so as to bring a fresh surface into contact with the test-ring before each test.

Surrounding the rear end of the shaft 25 is the hub 27 of a belt pulley 28 operatively but slidably connected thereto by a spline 29. This hub 27 is rotatably carried by ball bearings 30 on the inside of a ring 31 bolted to the rear face of the upright 20. The pulley 28 while free to rotate cannot move axially and is, therefore, always in the same plane as the driving pulley 32 on the end of the motor shaft. A belt 33 connects the two pulleys.

The mechanism for moving the test-ring axially to bring a fresh surface beneath the test-bar includes a bolt 37 extending through both uprights 19 and 20 parallel to the sleeve 24. This bolt 37 has a hexagonal head 38 on its front end and two collars 39 on either side of the rear upright 20. The middle portion of this bolt is in threaded engagement with a bracket 40 bolted to one side of the sleeve 24, as shown in Figure 6. As the bolt is freely rotatable in the uprights, but is prevented from moving axially with respect thereto by the collars thereon, it follows that by turning the bolt an axial movement of the sleeve, and hence of the test-ring, is produced.

The machine includes a rotatable member which may be a disk, ring, flanged wheel, or the like, all of which forms are intended to be included under the term test-ring. In the form of construction shown, the front end of the shaft 25 is formed with a frusto-conical head 42 to receive and support a test-ring 43. The ring is held in place by a nut 44. Below and surrounding the lower part of the test-ring and its associated parts is an oil cup 45 to receive a sample of the oil to be tested. This cup is held in place vertically by a slidably mounted pin 46 (Figure 3), the end of which is adapted to enter a hole in the upright 19. A cotter-pin 47 prevents the pin's being accidentally disconnected from the cup. Laterally, the cup is kept in position by the engagement of the back wall of the cup with the shaft, such wall being cut away semi-circularly to fit the end of the shaft behind the head 42. To remove the cup, all that is necessary is to pull the pin 46 out of the hole in the upright 19 and allow the cup to drop.

The test-bar-operating mechanism is mounted above the shaft 25. It comprises a rectangular block 50 (Figure 10) slidably mounted in a correspondingly formed recess in the upper part of the upright 19. Its rear face bears against a slidable member 49 in the rear part of such recess and its front edges bear against two strips 51 bolted to the front of the upright.

The block 50 is formed with an axial hole 52 to receive a heavy spring assembly 53 (Figure 11) and above that a filler block 54. The spring assembly comprises a heavy spring partially compressed between two disks 55 held together by a centrally arranged bolt member 56, the length of which can be adjusted by a screw 57. The filler block 54 has a central recess to receive the upper end of the bolt member 56, so that downward pressure on the filler block can depress the upper disk 55 and thereby compress the spring 53. At its upper end the filler block is formed with a slot 60 to receive a forwardly extending lug 61 on the slidable member 49. The latter has a rearwardly extending pin 62 passing through a slot 63 in the back of the recess in the upright 19 to connect the member 49 to suitable operating mechanism.

A threaded stud 66 mounted on the lower part of the block 50 is recessed at its lower side to receive a test block 67 in the form of a bar of high-speed steel. This bar is clamped in the desired longitudinal position by a nut 68 and washer 68' mounted on the threaded stud 66. It will be evident that by loosening the nut 68, the longitudinal position of the test-bar may be adjusted so as to bring a fresh part thereof opposite the top of the test-ring.

To hold the test-bar above the test ring 43, a light spring 69 is provided (Figure 3) pressing upwardly against the bottom of block 50 with sufficient force to overcome the weight of the block 50 and the parts operatively connected thereto.

When the member 49 is moved down, the block 50 moves therewith, the spring 69 being compressed as its tension is so much less than that of the spring 53, until the lower face of the bar 67 contacts the periphery of the ring 43. Further downward movement of the member 49 compresses the spring 53 producing a progressively increasing pressure between the parts 67 and 43. The pressure so produced is directly proportional to the amount the spring 53 is compressed and, hence, any suitable means for indicating the extent of such compression will give a measure of the force pressing the disk 67 against the ring 43. One convenient indicator is shown in Figure 7. The instrument comprises a dial 70 with a pointer 71, the angular movement of which is proportional to the linear distance a plunger 72 is depressed. The instrument is bolted to the face of the block 50 for movement therewith. To the top of the member 49 is secured a cap piece 73 carrying at its front edge a downwardly extending finger 74. While this cap piece or finger might be arranged to contact directly with the top of the plunger 72, it can also be connected indirectly by a pivoted lever device 65, as shown, to give any desired ratio of movement between the member 49 and the plunger 72.

Various means may be employed for giving downward movement to the member 49 to create the desired pressure between the bar 67 and the ring 43. As shown, this means comprises a shaft 75 journalled near one end in the forward part of legs 16 and near the other end in a bearing 76 bolted to the underside of the base 15. At its forward end this shaft is provided with an operating handle 77. At its rear end this shaft carries a crank 78, connected by a link 79 to a lever 80 pivotally attached to the upright 19 at 81. This lever is slotted intermediate its end to receive the pin 62 on the member 49. It will be noted that by virtue of the fact that the crank 78 is much shorter than the lever 80 and of the relative positions of the various parts, there is a toggle action so that the leverage of the handle 77 with respect to the pin 62 increases as the handle moves downwardly. This enables large pressures to be produced by a relatively short operating handle.

In the construction above described the test-bar is brought into contact with the test-ring by a single downward movement of the handle through an angle of less than 180°. Further, the handle is not only in front of the test-ring and the pressure-indicator, but also its shaft is below these parts so that the pressure can be readily observed while operating the handle.

What I claim is:

1. Apparatus for testing the boundary lubrication characteristics of oils, comprising a rotatable member, means for applying a film of the oil to be tested thereto, a second member formed of an alloy capable of retaining its hardness up to around 300° C., means for releasably holding the second member in fixed position, and means for pressing the second member against the rotatable member with progressively increasing force.

2. Apparatus for testing the boundary lubrication characteristics of oils, comprising a rotatable member, means for applying a film of the oil to be tested thereto, a second member formed of an alloy having the characteristic of red-hardness, means for releasably holding the second member in fixed position, and means for pressing the second member against the rotatable member with progressively increasing force.

3. Apparatus for testing the boundary lubrication characteristics of oils, comprising a horizontal rotatable shaft, a test-ring, means for mounting said ring on said shaft, means for supplying oil to the periphery of said ring, a member above said shaft slidable vertically towards and from said shaft, a test-block, means for securing said block to said member, a second member slidable parallel to the first, a heavy coil spring disposed between the two members, and lever means for exerting a rapidly releasable downward pressure on the second member to force said members and intervening heavy spring toward the test-ring to compress the heavy spring to produce the desired pressure between the test-block and test-ring.

4. Apparatus for testing the boundary lubrication characteristics of oils, comprising a horizontal rotatable shaft, a test-ring, means for mounting said ring on the front end of said shaft, means for supplying oil to the periphery of said ring, a member above said shaft slidable vertically towards and from said shaft, a test-block, means for securing said block to said member, a second rotatable shaft, a handle on such second shaft, connecting means between said member and the rear end of said second shaft for converting angular movement of the latter into vertical movement of said member to bring the test-block into engagement with the test-ring and vary the pressure therebetween, and a spring disposed under said member to raise said test-block out of contact with the test-ring when pressure is taken off the said handle.

5. Apparatus for testing the boundary lubrication characteristics of oils, comprising a frame, a rotatable shaft mounted on said frame, a test-ring, means for mounting said ring on said shaft, means for supplying oil to the periphery of said ring, a member slidable perpendicularly towards and away from said shaft, a test-block, means for securing said block to said member, a handle pivotally mounted on said frame for movement in a vertical plane, a second member slidable parallel to the first, a heavy coil spring between the two members, and connecting means disposed between said second member and said handle for converting angular movement of the latter into linear movement of said second member to bring the test-block into engagement with the test-ring and force it against the latter, such connecting means being constructed so that the second member is moved its full distance of travel toward the test-ring by a movement of the handle downward through an angle of less than 180°, and a spring disposed under the first member to raise said test-block out of contact with the test-ring when pressure is taken off said handle.

6. Apparatus for testing the boundary lubrication characteristics of oils, comprising a horizontal rotatable shaft, a test-ring, means for mounting said shaft, means for supplying oil to the periphery of said ring, a member above said shaft slidable vertically towards and from said shaft, a test-block formed by an alloy having the characteristics of red-hardness, means for securing said block to said member, a handle mounted to swing in a vertical plane, and a connecting linkage between said member and said handle for converting angular movement of the latter into vertical movement of said member to bring the test-block rapidly into and out of engagement with the test-ring and vary the pressure therebetween, said connecting means being so constructed that said member is moved its full distance of travel toward the test-ring by a movement of the handle downward through an angle of less than 180°.

7. Apparatus for testing the boundary lubrication characteristics of oils, comprising a horizontal rotatable shaft, a test-ring, means for mounting said ring on said shaft, means for supplying oil to the periphery of said ring, a member above said shaft slidable vertically towards and from said shaft, a test-block formed of an alloy having the characteristics of red-hardness, means for securing said block to said member, a second member slidable parallel to the first, a heavy coil spring disposed between the two members, and lever means for exerting a rapidly releasable downward pressure on the second member to force said members and intervening heavy spring toward the test-ring to compress the heavy spring to produce the desired pressure between the test-block and test-ring.

THOMAS L. CAMP.